C. SCHNEIDER.
Filters for Water-Coolers.
No. 139,085.  Patented May 20, 1873.
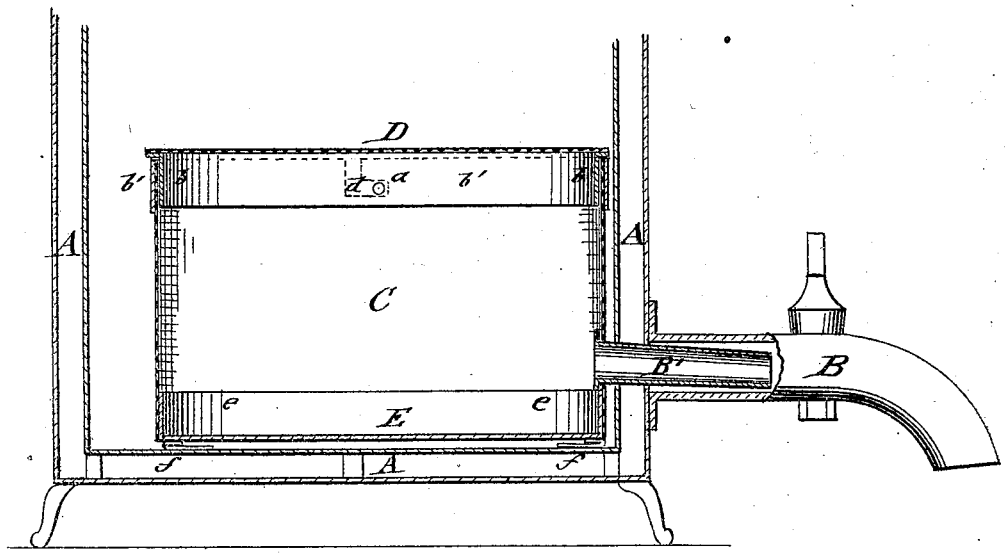
Witnesses:
Inventor:
C. Schneider
Per
Attorneys.

UNITED STATES PATENT OFFICE.

CHARLES SCHNEIDER, OF NEWARK, NEW JERSEY.

IMPROVEMENT IN FILTERS FOR WATER-COOLERS.

Specification forming part of Letters Patent No. 139,085, dated May 20, 1873; application filed April 26, 1873.

*To all whom it may concern:*

Be it known that I, CHARLES SCHNEIDER, of Newark, in the county of Essex and State of New Jersey, have invented a new and Improved Filter for Water-Cooler, of which the following is a specification:

The accompanying drawing represents a vertical longitudinal section of my improved filter placed into one of the water-coolers in common use.

The object of my invention is to provide an efficient filter for water-coolers, by which not only the impurities contained in the ice may be excluded, but also impure and unhealthy pump or aqueduct water filtered in such a manner that the clear and limpid liquid is drawn off. The whole filter is constructed to be detachable for cleaning and refilling with charcoal or other absorbing material, as required. My invention consists of a cylindrical filter of wire-gauze, having a detachable top and adjustable bottom. A conical spout, to be placed into the inside of the faucet of the cooler, closes the faucet and prevents thereby the escape of unfiltered water.

In the drawing, A represents the body of one of the water-coolers in general use, B its faucet, and C the filter, placed on the bottom of cooler A. Its spout B', of conical shape, is placed near the bottom part of filter C, and closed at its inside opening with wire-gauze. The projecting end is inserted into the inside of faucet B till the conical shape closes the opening of the same, and compels thereby all the water of the cooler to pass through filter C.

The diameter of the filter is so much smaller than the diameter of the cooler that it may with its spout be easily placed within and taken out of the cooler. The filter C is of cylindrical shape to suit the usual form of cooler, but may also be made in oval or other shape, as required.

The side and top are covered with wire-gauze, the bottom being of tin or other suitable material. The top D is detachable, and may be locked to the body of the filter by lugs or pins $a$ of its metal rim $b$, which are placed opposite to each other, and inserted into recesses $d$ of rim $b'$ of the cylindrical part of the filter. The recesses $d$ extend from the upper edge of rim $b'$ under right angles, so that lugs $a$ produce, on turning the top D, a rigid connection with the body of the filter. The charcoal or other purifying material may, therefore, from time to time, be replaced when its absorbing capacity is exhausted. The bottom E of the filter is provided with three or more legs, $f$, which may be cut or bent for the exact adjustment of spout B' in the faucet B. A metallic band, $e$, strengthens, in connection with bottom E and spout B', the cylindrical part of the filter, producing thereby a strong and durable device for filtering the ice-water of the coolers.

Having thus described my invention, I claim as new and desire to secure by Letters Patent—

1. The water-cooler filter C, having conical spout B', detachable top D, and adjustable legs $f$, substantially as and for the purpose described.

2. The combination of filter C with faucet B and cooler A, to produce filtering of all the water drawn off, as set forth.

CHARLES SCHNEIDER.

Witnesses:
 HENRY ROMMEL,
 NICHOLAS PEIFFER.